(12) United States Patent
Valembois et al.

(10) Patent No.: US 12,413,110 B2
(45) Date of Patent: Sep. 9, 2025

(54) COMPOSITE-STRUCTURE ROTOR

(71) Applicant: HUTCHINSON, Paris (FR)

(72) Inventors: Guy Valembois, Lauzerville (FR); Etienne Breton, Escalquens (FR); Nicolas Fischer, Palaiseau (FR); Jean-Christophe Rietsch, Corbeil (FR); Vincent Joseph, Montargis (FR); Jean-Michel Buchin, Lons le Saunier (FR)

(73) Assignee: HUTCHINSON, Paris (FR)

( * ) Notice: Subject to any disclaimer, the term of this patent is extended or adjusted under 35 U.S.C. 154(b) by 341 days.

(21) Appl. No.: 18/018,212

(22) PCT Filed: Jul. 27, 2021

(86) PCT No.: PCT/EP2021/070950
§ 371 (c)(1),
(2) Date: Jan. 26, 2023

(87) PCT Pub. No.: WO2022/023314
PCT Pub. Date: Feb. 3, 2022

(65) Prior Publication Data
US 2023/0275479 A1    Aug. 31, 2023

(30) Foreign Application Priority Data
Jul. 27, 2020  (FR) ...................................... 2007913

(51) Int. Cl.
*H02K 1/2793*  (2022.01)
*H02K 7/00*    (2006.01)

(52) U.S. Cl.
CPC ........... *H02K 1/2793* (2013.01); *H02K 7/003* (2013.01)

(58) Field of Classification Search
CPC ............................. H02K 1/2793; H02K 7/003
See application file for complete search history.

(56) References Cited

U.S. PATENT DOCUMENTS

| 4,864,175 A | 9/1989 | Rossi |
| 7,714,479 B2 * | 5/2010 | Seneff ................. H02K 1/2795 310/156.21 |

(Continued)

FOREIGN PATENT DOCUMENTS

| CN | 113612325 A | * 11/2021 |
| EP | 2773023 A1 | 9/2014 |
| FR | 3033095 A1 | 8/2016 |

OTHER PUBLICATIONS

International Search Report related to Application No., PCT/EP2021/070950; reported on Sep. 28, 2021.

*Primary Examiner* — Forrest M Phillips
(74) *Attorney, Agent, or Firm* — von Briesen & Roper, s.c.

(57) ABSTRACT

Composite-structure rotor for axial flow electrical machines comprising at least one stator and a rotor rigidly connected to a shaft to be rotated, in the shape of a disc and comprising a plurality of permanent magnets supported by a support made of a composite material rigidly connected to the shaft to be driven and constituted by a reinforced fibre matrix. The rotor comprises distributed attachment means for the radial elements and segments, which connect the elements in pairs, forming recesses, and which comprise at least one strap resulting from the winding of continuous unidirectional fibres passing between the Composite-structure rotor for axial flow electrical machines comprising at least one stator and a rotor rigidly connected to a shaft to be rotated, in the shape of a disc and comprising a plurality of permanent magnets supported by a support made of a composite material rigidly connected to the shaft to be driven and constituted by a reinforced fibre matrix. The rotor comprises distributed attachment means for the radial elements and segments, which connect the elements in pairs, forming recesses, and which comprise at least one strap resulting (Continued)

from the winding of continuous unidirectional fibres passing between the magnets, on the outside edge thereof, as well as on each of the attachment means, in order to form a collective retention of the magnets.

9 Claims, 6 Drawing Sheets

(56) References Cited

U.S. PATENT DOCUMENTS

| | | | |
|---|---|---|---|
| 9,490,685 B2* | 11/2016 | Takemoto | H02K 21/24 |
| 2006/0138890 A1 | 6/2006 | Kato | |
| 2009/0072639 A1* | 3/2009 | Seneff | H02K 15/03 |
| | | | 310/156.31 |
| 2011/0006631 A1 | 1/2011 | Lamperth et al. | |
| 2013/0020900 A1* | 1/2013 | Takeuchi | H02K 5/128 |
| | | | 310/214 |
| 2020/0028393 A1 | 1/2020 | Ravaud | |

* cited by examiner

COMPOSITE-STRUCTURE ROTOR

CROSS-REFERENCE TO RELATED APPLICATION

This Application is a 35 USC § 371 US National Stage filing of International Application No. PCT/EP2021/070950 filed on Jul. 27, 2021, which claims priority under the Paris Convention to France Patent Application No. 2007913 filed on Jul. 27, 2020.

The present invention relates, in the field of axial flow electrical machines, to a rotor with composite structure, as well as an axial flow electrical machine including such a rotor.

FIELD OF THE DISCLOSURE

Such rotors are already known, intended for application in the automobile, in the drive train of an electric or hybrid vehicle, or the like. These rotors use composite materials to mitigate the risk of overheating of the permanent magnet rotor, which can disrupt the magnetic flux and restrict performance. Thus, the permanent magnets can be embedded in a composite material or disposed on a composite material support, possibly in recesses provided for this purpose, which makes it possible to reduce the mass and therefore the phenomenon of overheating, with however the disadvantage of lower strength resulting from the stresses due to the inertial force and centrifugal force.

To remedy this problem, it has been proposed to equip the periphery of the rotor with a hoop, made of fiber-reinforced composite material, allowing the magnets subject to centrifugal force to be contained.

With the aim of improvement, and more particularly to resolve the problems of resistance generated by increased rotational speeds, document FR 3 027 468 proposed a rotor equipped with a cylindrical hoop constituted of a winding of unidirectional fibers and arranged to exert a prestressing force on the poles of underlying magnets, and capable of compressing the underlying magnet poles in the direction of the shaft element by means of inserts disposed between the magnet poles and the shaft element.

While the rotor thus designed made it possible to resolve the problems posed at the time, it is now outdated in view of the desired rotational speeds, under which the hoop, despite its low mass, is subject to centrifugal force.

SUMMARY OF THE DISCLOSURE

Also known from document US 2020/028393 is a rotor comprising a composite structure wherein are arranged cells intended to house magnets. The composite material structure thus includes peripheral recesses each able to contain magnets, each of said recesses being delimited, at least laterally, by two radial or substantially radial elements and on the side of the rotor periphery by a wall connecting said two radial or substantially radial elements and against which the magnets are supported by its outer edge. Advantageously, the composite structure consists of a resin reinforced with fibers oriented in different directions. Although such a structure has a higher strength, it is however not optimal, since it is linked to that of the matrix constituted by the resin.

Also known from document US 2006/138890 is a rotor wherein each of the magnets is housed in an element in the shape of a frame, the elements in the shape of a frame then being assembled to the hub. The elements in the shape of frames are each made of a resin reinforced with fibers, and preferably of a continuous fiber forming a strap. Such a construction offers greater strength than that proposed in document US 2020/028393, but requires the production of a large number of parts.

The object of the present invention is to propose a rotor with a composite structure for an axial flow electrical machine, which offers increased strength making it possible to meet new market requirements.

According to the invention a rotor is proposed with a composite structure, for axial flow machines comprising at least one stator and one rotor integral with a shaft to be rotated, shaped as a disc and including a plurality of permanent magnets carried by a composite material support rigidly connected to said driven shaft and consisting of a fiber reinforced matrix, said composite material support including peripheral recesses each able to contain a magnet, each of said recesses being delimited, at least laterally, by two radial or substantially radial elements and on the side of the periphery of the rotor by a segment connecting said two radial or substantially radial elements and against which a magnet is supported by its outer edge, the rotor being characterized in that it includes attachment means distributed peripherally around the passage of said shaft, and in that said radial or substantially radial elements, of several recesses, whether or not neighbors, as well as the segments connecting the said radial or substantially radial elements in pairs, for one or more recesses, whether or not neighbors, consist of at least one strap, resulting from the winding of continuous unidirectional fibers passing between the said magnets, on the outer edge thereof, as well as on each of said attachment means, to form a collective retention of the magnets. The radial or substantially radial orientation of the lateral elements is dependent on the shape of the magnets, which are not systematically in the form of circular segments, but can take various shapes.

According to an additional characteristic of the rotor according to the invention, it includes several straps, each disposed in a different plane and parallel to the general plane of the rotor, each of said straps forming recesses each dedicated to one out of two magnets, the recesses of two adjacent straps being offset angularly so as not to accommodate the same magnets.

According to another additional characteristic of the rotor according to the invention, it includes several straps, each disposed in a different plane, parallel to the general plane of the rotor, each of said straps forming recesses each dedicated to a group of magnets, the recesses of two adjacent straps being offset angularly so as not to accommodate groups of identical magnets.

According to another additional characteristic of the rotor according to the invention, it includes several straps, disposed in planes parallel to the general plane of the rotor, each of said planes including several straps forming a recess dedicated to a group of magnets, the recesses of the traps of two adjacent planes being offset angularly so as not to accommodate groups of identical magnets.

According to another additional characteristic of the rotor according to the invention, in includes a hoop consisting of a banding resulting from a winding of unidirectional continuous fibers.

The hoop may not be necessary, but when the rotor according to the invention includes one, it may be of reduced size compared to the hoops usually used.

According to another additional characteristic of the rotor according to the invention, the attachment means consist of pins with axes parallel to that through which the driven shaft passes, and distributed coaxially.

The advantages and characteristics of the rotor according to the invention will emerge more clearly from the description which follows and which relates to the appended drawing, which represents several non-limiting embodiments thereof.

DETAILED DESCRIPTION OF THE DISCLOSURE

Figure 1:
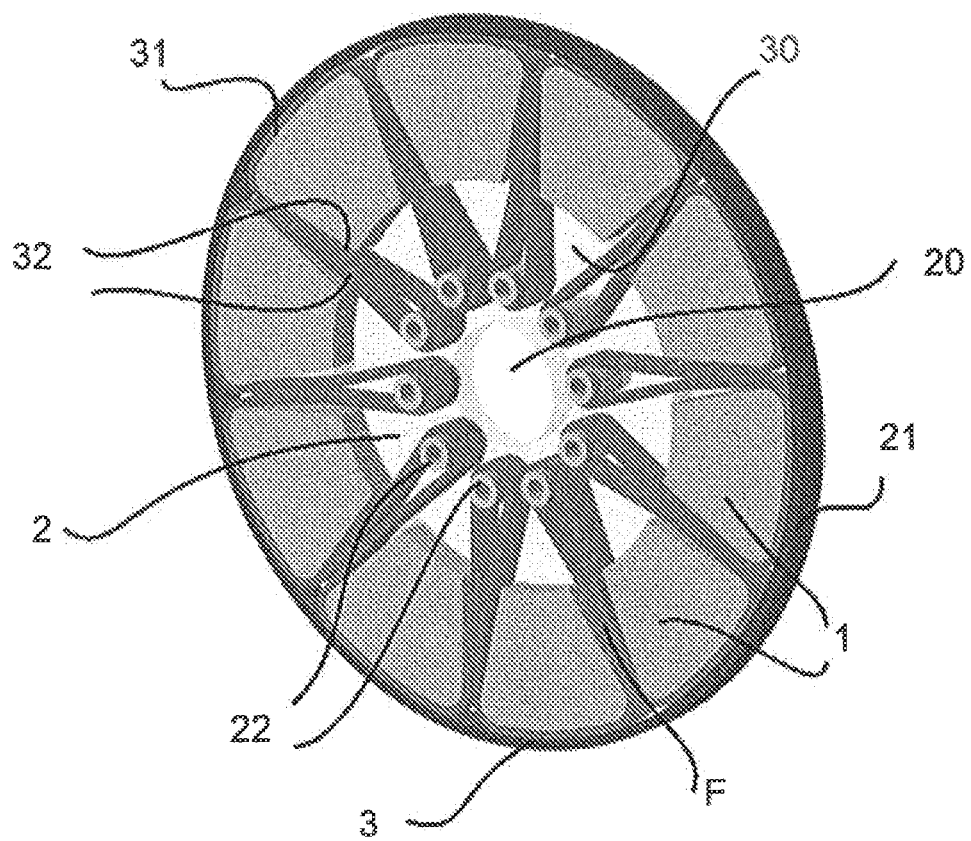
FIG. 1 represents a schematic perspective view of a first embodiment of the rotor according to the invention.

With reference to FIG. 1, a rotor of an electrical machine with axial flow according to the invention can be seen.

In a known manner, this rotor includes a plurality of permanent magnets 1, in this case in the form of circular sectors, disposed radially side by side, on a disk-shaped support 2 made of a composite material, and including centrally a hole 20 intended for the passage and securing of a shaft, not shown, and intended to be axially rotated. On the other hand, the rotor peripherally reinforces a hoop 21 in the form of a ring.

According to the invention, the support 2 includes, distributed around the hole 20, a multiplicity of pins 22, with axes parallel to that of the hole 20, in this case, in this first embodiment, in number equal to that of the magnets 1, and each aligned radially with a space separating two neighboring magnets 1.

From a manufacturing point of view, these pins 22 are, without limitation, made of ceramic.

In this figure it can also be seen that the magnets 1 are all connected by a strap 3, which passes on the one hand over the outer edge of each magnet 1, and on the other hand between each of the magnets 1, twice after having gone around a pin 22. This strap 3 is obtained by winding a unidirectional reinforcement fiber F, which created recesses 30 each delimited in the periphery by a part 31 in the shape of an arc of a circle and by two radial branches 32.

The magnets 1 are thereby retained firmly in the recesses 30, the part 31 in the form of an arc of a circle, constituting the locking means and the radial branches 32 of the retention means.

It is not necessary for the recess to be delimited on the side of the hole 20, since a force does not tend to attract the magnets 1 in the direction of the shaft, the sector shape of the magnets and the corresponding shape of the recesses 30 being sufficient to hold the magnets 1, which are also held in the matrix constituting the support 2.

The winding is preferably made with prestressing, so as to prevent the elongation of the branches 32 and therefore to perfectly immobilize the magnets 1 during rotation at very high speed.

Figure 2:
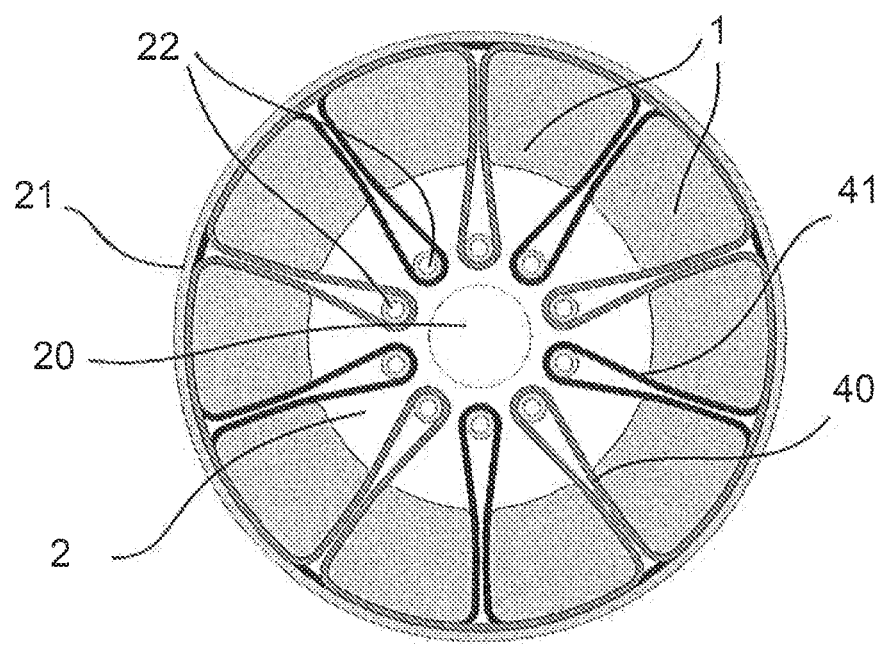
FIG. 2 represents a schematic perspective view of another embodiment of the rotor according to the invention.
Figure 3:
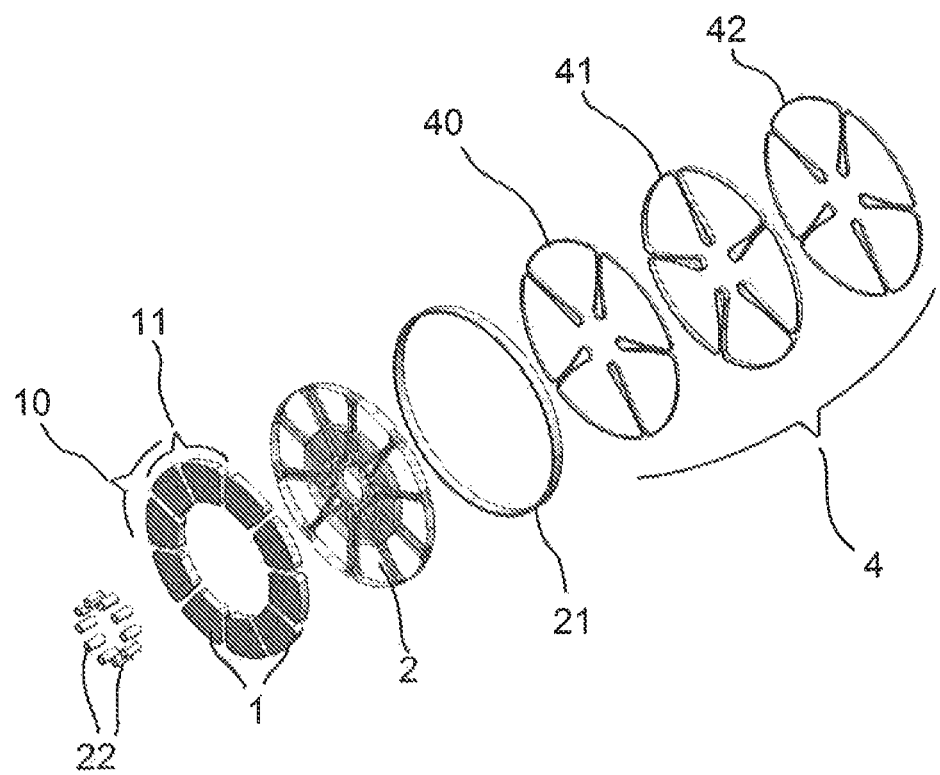
FIG. 3 represents a schematic perspective and exploded view of the rotor of FIG. 2.

With reference to FIGS. 2 and 3, a variant of the rotor according to the invention can be seen, wherein there is a support 2, pins 22, magnets 1 in the form of an angular sector and a hoop 21.

In this embodiment, retention of the magnets 1 is achieved by a set 4 of three straps 40, 41 and 42, disposed in separate planes, parallel to the general plane of the rotor. Thus, the inner strap 41 is placed between the two outer straps 40 and 42.

The inner strap 41 passes around one pin 22 out of two, while between each pass around a pin 22 it runs radially along a magnet 1, passes peripherally over the outer edge of a group 10 of two neighboring magnets 1, to reach the next pin 22. This strap 41 therefore wraps around successive groups 10 of two magnets 1.

The outer strap 40 is wound identically, except that it passes around the pins 22 not used by the inner strap 41, and that it wraps around groups 11 of magnets 1, consisting of two magnets 1 each from two neighboring groups 10.

The outer strap 42 is wound identically to outer strap 40 and wraps around groups 11 of magnets 1.

Each of the magnets 1 is therefore held individually, but by straps disposed in different plans, and offset angularly with respect to the neighboring strap or straps. It will be noted that the number of three straps is not limiting.

Figure 4:
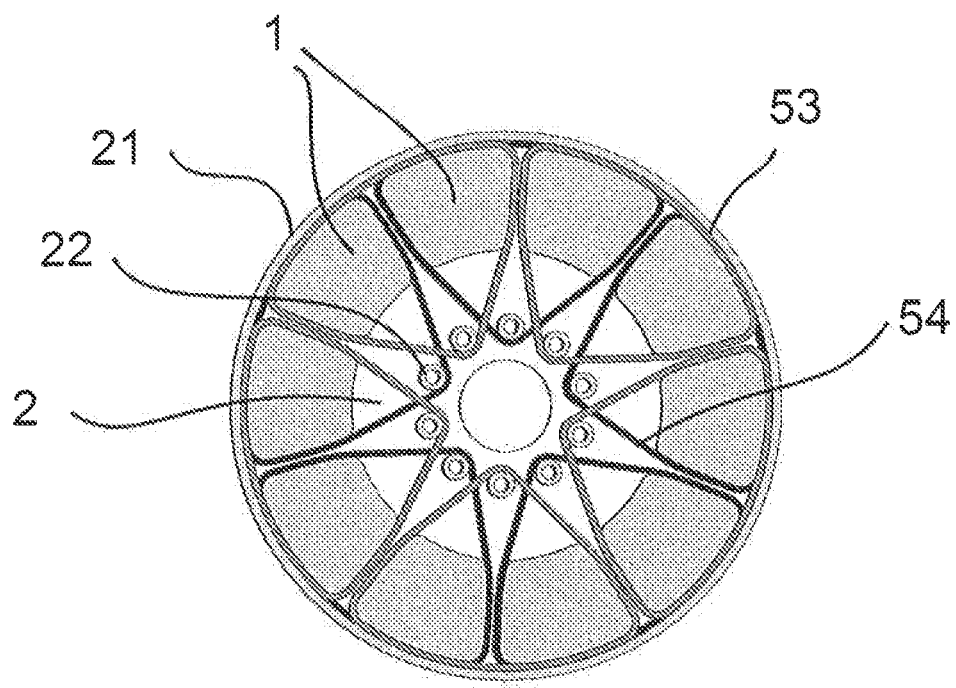
FIG. 4 represents a partial schematic view of another embodiment of the rotor according to the invention.
Figure 5:
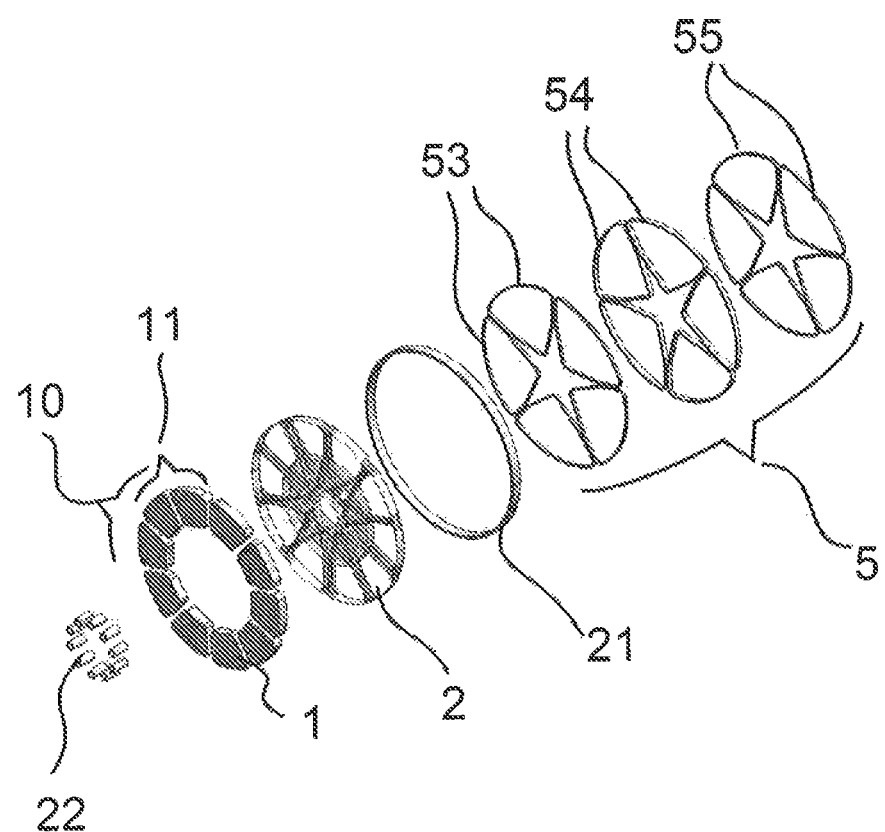
FIG. 5 is a schematic perspective and exploded view of the rotor of FIG. 4.

With reference now to FIGS. 4 and 5, another variant can be seen, wherein is found a support 2, pins 22, magnets 1 in the form of an angular sector and a hoop 21.

In this embodiment the retention of the magnets 1 is carried out by a set 5 of three sets 50, 51 and 52 of straps, disposed in separate planes, parallel to the general plane of the rotor. Thus, the inner set 51 of straps is placed between the two outer sets of straps 50 and 52.

Each set 50, 51 and 52 comprises five straps, 53, 54 and 55 respectively, each intended to wrap around a group of two magnets, also passing around a pin 22.

Each of the straps 54 of the inner group 51 thereby wraps around groups 10 of magnets 1, while each of straps 50 and 52 wraps around a group 11 of magnets 1, groups 10 and 11 being angularly offset, as in the embodiment shown in FIGS. 2 and 3.

Figure 6:
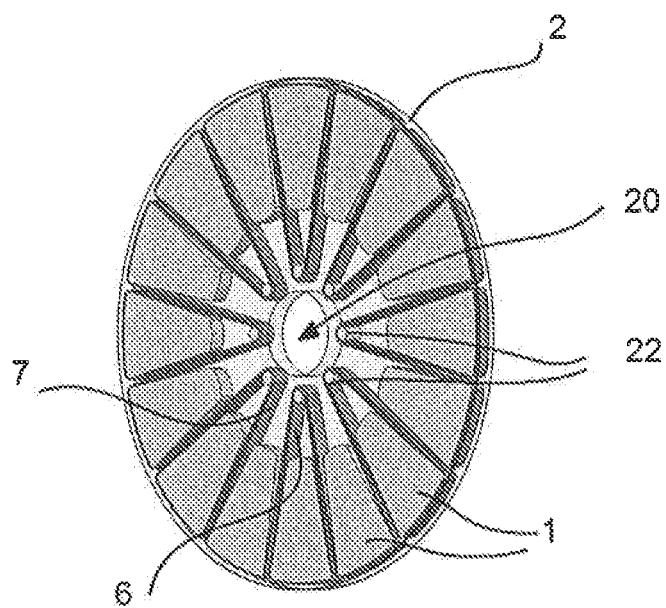
FIG. 6 represents a schematic perspective view of another embodiment of the rotor according to the invention.

FIG. 6 shows another embodiment of the rotor according to the invention, wherein one magnet 1 out of two is held individually by a strap 6, also coming from a filament winding of unidirectional continuous fibers, while all the other magnets 1 are held collectively by a single strap 7, on the same pins 22 as the straps 6, so that the number of pins 22 can be divided by two.

Figure 7A:
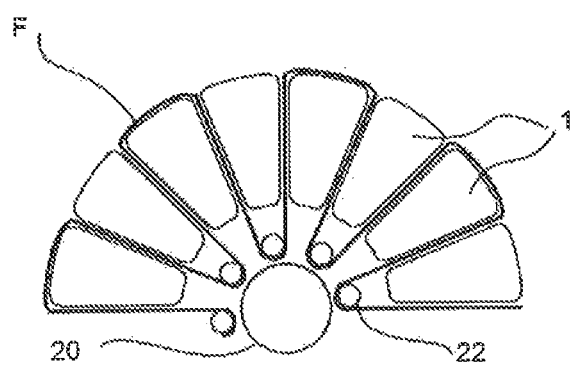
FIGS. 7a and 7b represents a partial schematic view of the manufacturing steps of a rotor according to the invention.
Figure 7B:
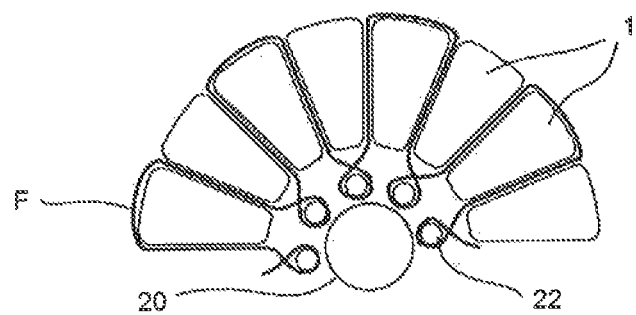
Figure 8:
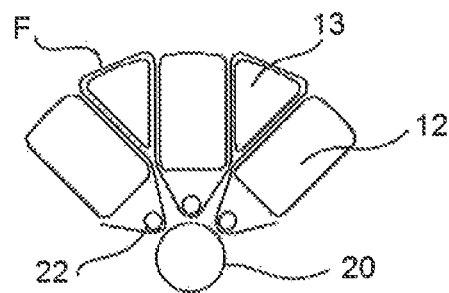
FIG. 8 represents a partial schematic view of another manufacturing step of another embodiment of the rotor according to the invention.
Figure 9:
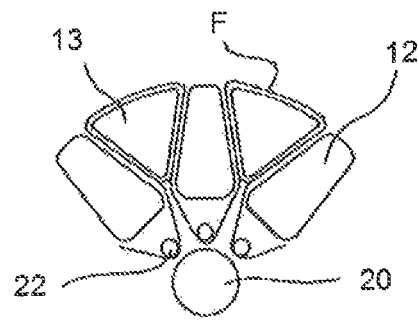
FIG. 9 represents a partial schematic view of a manufacturing step of another embodiment of the rotor according to the invention.
Figure 10A:
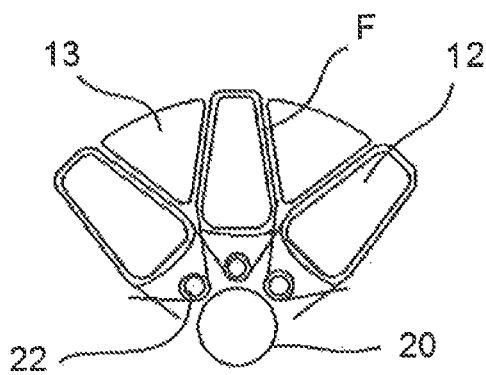
FIGS. 10A and 10B represent two partial schematic views of two manufacturing steps of another embodiment of the rotor according to the invention.
Figure 10B:
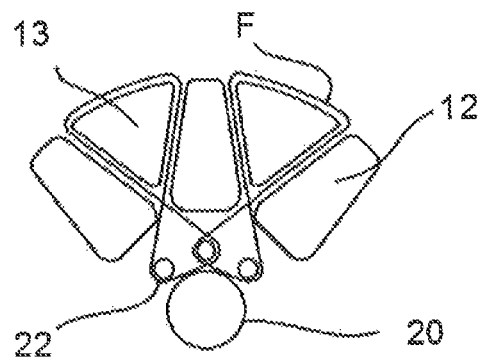

FIGS. 7a and 7b show different ways of winding the fiber around magnets 1 and pins 22.

With reference now to FIGS. 8, 9, 10a and 10b, and 11, manufacturing steps of a rotor according to the invention can be seen, by winding fibers F, in different cases, not limiting, where the magnets 1 have shapes other than circular sectors.

In these figures, the rotor includes alternately magnets 12 of rectangular or similar shape and magnets 13 of triangular shape, and different possibilities can be seen of winding of magnets or groups of magnets, windings superimposable in layers for example, as in the embodiments of embodiments of FIGS. 2 and 4.

Figure 11:
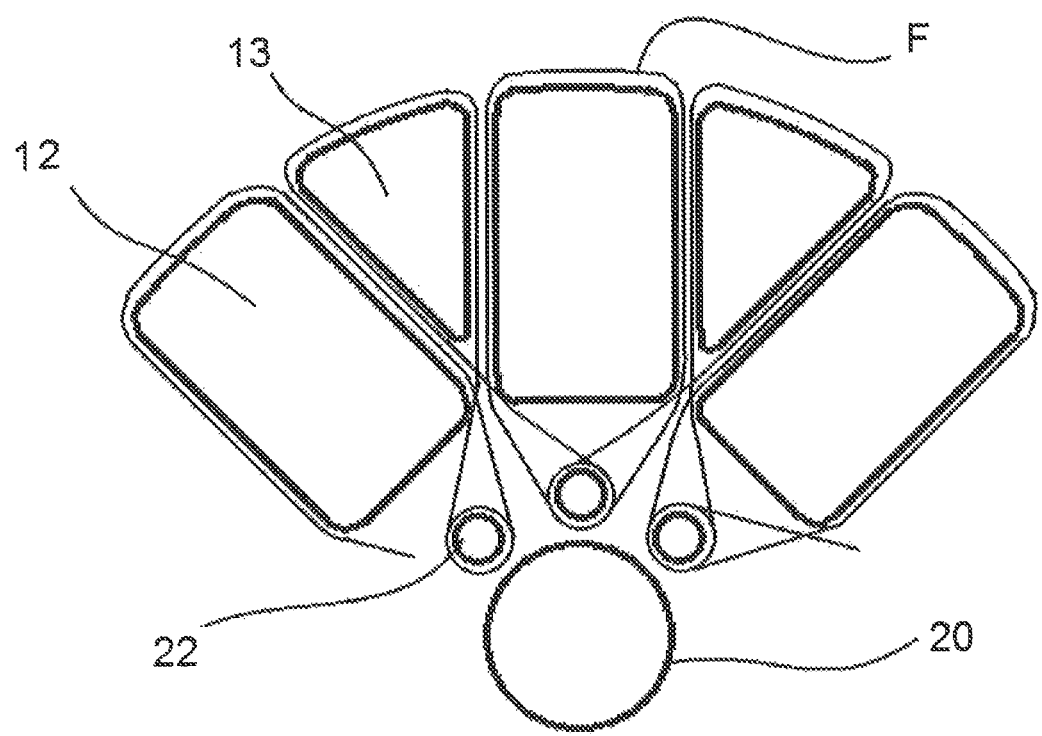
FIG. 11 represents a partial schematic view of a manufacturing step of the rotor according to the invention.

In FIG. 11, the magnets 12 and 13 are wound with the same fiber by winding around pins 22.

Of course, other combinations are possible, the main thing being to create a trellis of fibers F making it possible to create a structure capable of containing the effects of the centrifugal force on the magnets.

Whatever its embodiment, the rotor according to the invention has high strength for a very low mass, without the risk of excessive overheating. The rotor can be used with or without a hoop, and if it includes one, it can be of reduced dimensions, and therefore of low mass.

The invention claimed is:

1. A rotor with a compo structure, for axial flow machines, comprising at least one stator and one rotor rigidly connected to a shaft to be rotated, shaped as a disc and including a plurality of perm sis carried by a comp material support secured to said driven shaft and consisting of a fiber reinforced matrix, said composite material support including peripheral recesses each able to contain a magnet, each of said recesses being delimited, at least laterally, by two radial or substantially radial elements and on the side of the periphery of the rotor by a segment connecting said two radial or substantially radial elements and against which a magnet is supported by its outer edge, wherein the rotor includes attachment means distributed peripherally around the passage of said shaft, and in that said radial or substantially radial elements, of several recesses, whether or not neighbors, as well as the segments connecting the said radial or substantially radial elements in pairs, for one or more recesses, whether or not neighbors, consist of at least one strap, resulting from the winding of continuous unidirectional fibers passing between the said magnets, on the outer edge thereof, as well as on each of said attachment means, to form a collective retention of the magnets, wherein the rotor includes several straps, each disposed in different plane parallel to the general plane of the rotor, each of said straps forming recesses each dedicated to one magnet out of two, the recesses of two adjacent straps being angularly offset so as not to accommodate the same magnets.

2. The rotor according to claim 1, characterized in that it includes a hoop consisting of a banding from a winding of unidirectional continuous fibers.

3. The rotor according to claim 1, characterized in that the attachment means consist of pins with axes parallel to that through which driven shaft passes, and distributed coaxially.

4. A rotor with a composite structure, for axial flow machines, comprising at least one stator and one rotor rigidly connected to a shaft to be rotated, shaped as a disc and including a plurality of permanent magnets carried by a composite material support secured to said driven shaft and consisting of a fiber reinforced matrix, said composite material support including peripheral recesses each able to contain a magnet, each of said recesses being delimited, at least laterally, by two radial or substantially radial elements and on the side of the periphery off rotor by a segment connecting said two radial or substantially radial elements and against which a magnet is supported by its outer edge, wherein the rotor includes attachment means distributed peripherally around the passage of said shaft, and in that said radial or substantially radial elements, of several recesses, whether or not neighbors, as well as the segments connecting the said radial or substantially radial elements in pairs, for one or more recesses, whether or not neighbors, consist of at least one strap, resulting from the winding of continuous unidirectional fibers passing between the said magnets, on the outer edge thereof, as well as on each of said attachment means, to form a collective retention of the magnets, wherein the rotor includes several straps, each disposed in a different plane, parallel to the general plane of the rotor, each of said straps forming recesses each dedicated to a group of magnets, the recesses of two adjacent magnets being offset angularly so as not to accommodate groups of identical magnets.

5. The rotor according to claim 4, characterized in that it includes a hoop consisting of a banding from a winding of unidirectional continuous fibers.

6. The rotor according to claim 4, characterized in that the attachment means consist of pins with axes parallel to that through which driven shaft passes, and distributed coaxially.

7. A rotor with a composite structure, for axial flow machines comprising at least one stator and one rotor rigidly connected to a shaft to be rotated, shaped as a disc and including a plurality of permanent magnets carried by a composite material support secured to said driven shaft and consisting of a fiber reinforced matrix, said composite material support including peripheral recesses each able to contain a magnet, each of said recesses being delimited, at least laterally, by two radial or substantially radial elements and on the side of the periphery of the rotor by a segment connecting said two radial or substantially radial elements and against which a magnet is supported by its outer edge, wherein the rotor includes attachment means distributed peripherally around the passage of said shaft, and in that said radial or substantially radial elements, of several recesses, whether or not neighbors, as well as the segments connecting the said radial or substantially radial elements in pairs, for one or more recesses, whether or not neighbors, consist of at least one strap, resulting from the winding of continuous unidirectional fibers passing between the said magnets, on the outer edge thereof, as well as on each of id attachment means, to form a collective retention of the magnets, wherein the rotor includes several straps, disposed in planes parallel to the general plane of the rotor, each of said planes including several straps forming a recess dedicated to a group of magnets, the recesses of the straps of two adjacent planes being angularly offset so as not to accommodate groups of identical magnets.

8. The rotor according to claim 7, characterized in that it includes a hoop consisting of a banding from a winding of unidirectional continuous fibers.

9. The rotor according to claim 7, characterized in that the attachment means consist of pins with axes parallel to that through which driven shaft passes, and distributed coaxially.

* * * * *